United States Patent
Matsuda et al.

(10) Patent No.: US 10,438,270 B2
(45) Date of Patent: Oct. 8, 2019

(54) APPARATUS AND METHOD FOR INFORMATION PROCESSING AND RECORDING

(75) Inventors: Atsuyoshi Matsuda, Shinagawa-ku (JP); Fumihiro Kawasaki, Shinagawa-ku (JP); Chihiro Miura, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 1138 days.

(21) Appl. No.: 14/360,043

(22) PCT Filed: Jul. 4, 2012

(86) PCT No.: PCT/JP2012/067047
§ 371 (c)(1),
(2), (4) Date: Jan. 20, 2015

(87) PCT Pub. No.: WO2013/077023
PCT Pub. Date: May 30, 2013

(65) Prior Publication Data
US 2015/0134475 A1 May 14, 2015

(30) Foreign Application Priority Data
Nov. 25, 2011 (JP) .................. 2011-258230

(51) Int. Cl.
*G06Q 30/00* (2012.01)
*G06Q 30/06* (2012.01)

(52) U.S. Cl.
CPC ......... *G06Q 30/0631* (2013.01); *G06Q 30/06* (2013.01)

(58) Field of Classification Search
CPC .................. G06Q 30/0631; G06Q 30/06
(Continued)

(56) References Cited

U.S. PATENT DOCUMENTS 6,563,514 B1   5/2003 Samar
8,250,105 B2 *  8/2012 Bollinger ............ G06F 16/2465
                                         707/793
(Continued)

FOREIGN PATENT DOCUMENTS

CN   101408960 A    4/2009
JP   10-334120 A   12/1998
(Continued)

OTHER PUBLICATIONS

Flexible robust programming in distributed object systems (Year: 2002).*
(Continued)

*Primary Examiner* — Jeffrey A. Smith
*Assistant Examiner* — Lalith M Duraisamygurusamy
(74) *Attorney, Agent, or Firm* — Sughrue Mion, PLLC

(57) ABSTRACT

Provided are an information processing apparatus, an information processing method, an information processing program, and a recording medium storing thereon the information processing program, which can prevent a transaction disadvantageous to a user or registration of disadvantageous transaction objects. The information processing apparatus extracts a transaction object, which is identical to or related to a transaction object to be selected by a user and with which a condition more advantageous than the corresponding transaction object is associated, from a storing means that stores information on transaction objects referred to in the past time by the user, and presents the extracted transaction object to the user.

24 Claims, 7 Drawing Sheets

(58) Field of Classification Search
USPC .................................................... 705/26.7
See application file for complete search history.

(56) References Cited

U.S. PATENT DOCUMENTS

| | | | | |
|---|---|---|---|---|
| 2003/0135440 | A1* | 7/2003 | Senga | G06Q 30/06 705/37 |
| 2006/0156063 | A1* | 7/2006 | Mazzarella | G06Q 10/10 714/12 |
| 2007/0150361 | A1 | 6/2007 | Kreiner et al. | |
| 2007/0239560 | A1* | 10/2007 | McGuire | G06Q 30/02 705/14.46 |
| 2007/0239604 | A1* | 10/2007 | O'Connell | G06Q 30/06 705/50 |
| 2008/0319778 | A1* | 12/2008 | Abhyanker | G06Q 10/10 705/14.1 |
| 2009/0178001 | A1* | 7/2009 | Verheyden | G11B 27/105 715/810 |
| 2010/0131898 | A1* | 5/2010 | Hiraiwa | G06F 16/51 715/818 |
| 2011/0029403 | A1* | 2/2011 | Xu | G06Q 30/00 705/26.7 |
| 2011/0181628 | A1* | 7/2011 | You | G09G 3/20 345/690 |
| 2012/0182226 | A1* | 7/2012 | Tuli | G06F 3/04883 345/173 |
| 2012/0198347 | A1* | 8/2012 | Hirvonen | G06F 16/9535 715/738 |

FOREIGN PATENT DOCUMENTS

| | | |
|---|---|---|
| JP | 2008-282132 A | 11/2008 |
| JP | 2011-128805 A | 6/2011 |

OTHER PUBLICATIONS

Translation of International Preliminary Report on Patentability dated Sep. 10, 2012 issued in Patent Application No. PCT/JP2012/067047.

Kazuki Mae, "Guguru wa Mou Furui!? Tayoka suru Saishin no Kensaku Gijutsu", Gekken Ascii Dot Technologies, Dec. 24, 2010, pp. 88-91, vol. 16, No. 2.

Zhou Anping, et al., "Omniget: Daisansha Joho o Teiji suru Browser Nai Browser", Proceedings of the 14th Annual meeting of the Association for Natural Language Processing, Mar. 17, 2008, pp. 717-720.

Tomonari Ishizu, et al., "A Study on the Net-shopping Support Techniques by Access Log Analysis", IPSJ SIG Notes, Heisei 22 Nendo 1, Jun. 15, 2010, No. 54.

International Search Report for PCT/JP2012/067047, dated Oct. 9, 2012.

Flanagan, David, "JavaScript: The Definitive Guide Fourth Edition", Jan. 2002, XP-002276673, pp. 1-10 (12 pages).

Bibeault, Bear, et al., "4.1. Understanding the browser event models: Events are where it happens", jQuery in Action, Second Edition, Oct. 15, 2010, XP055195592, pp. 82-98 (17 pages).

* cited by examiner

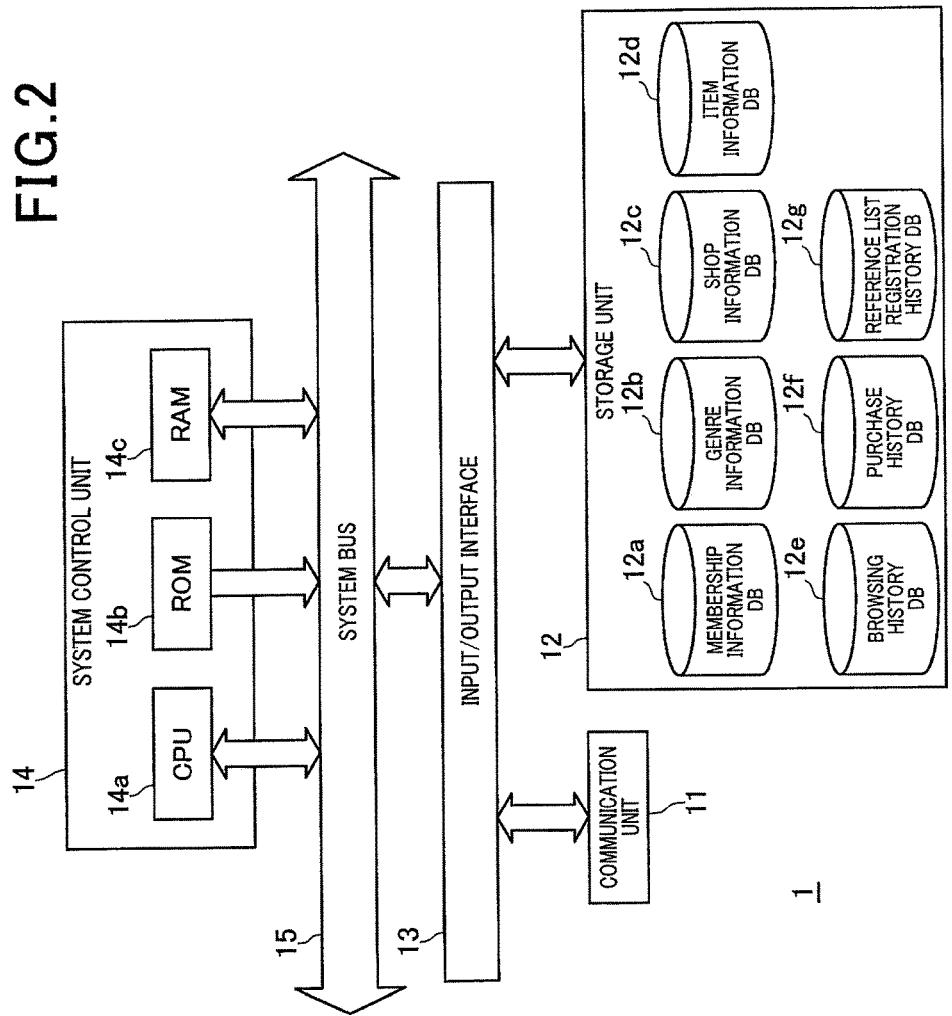

| MEMBERSHIP INFORMATION DB |
|---|
| USER ID |
| PASSWORD |
| NICKNAME |
| NAME |
| DATE OF BIRTH |
| GENDER |
| ZIP CODE |
| ADDRESS |
| TELEPHONE NUMBER |
| EMAIL ADDRESS |
| . . . . . |

| GENRE INFORMATION DB |
|---|
| GENRE ID |
| GENRE NAME |
| GENRE LEVEL |
| PARENT GENRE ID |
| CHILD GENRE ID LIST |
| . . . . . |

| SHOP INFORMATION DB |
|---|
| SHOP ID |
| PASSWORD |
| SHOP NAME |
| ZIP CODE |
| ADDRESS |
| TELEPHONE NUMBER |
| EMAIL ADDRESS |
| SHOP EVALUATION INFORMATION |
| . . . . . |

| ITEM INFORMATION DB |
|---|
| ITEM ID |
| SHOP ID |
| ITEM CODE |
| GENRE ID |
| RELATED ITEM LIST |
| ITEM NAME |
| ITEM IMAGE URL |
| ITEM DESCRIPTION |
| NUMBER OF ITEMS |
| ITEM PRICE |
| RELEASE PERIOD |
| VERSION NUMBER |
| GRANTED POINT |
| NUMBER OF ITEMS IN STOCK |
| PAYMENT METHOD |
| DELIVERY METHOD |
| NUMBER OF DAYS REQUIRED FOR DELIVERY |
| DELIVERY FEE |
| . . . . . |

| BROWSING HISTORY DB |
|---|
| USER ID |
| URL OF PAGE |
| ITEM ID |
| ITEM CODE |
| ITEM NAME |
| GENRE ID |
| SHOP ID |
| BROWSING DATE AND TIME |
| . . . . . |

| PURCHASE HISTORY DB |
|---|
| USER ID |
| ITEM ID |
| ITEM CODE |
| ITEM NAME |
| GENRE ID |
| SHOP ID |
| NUMBER OF PURCHASES |
| PURCHASE PRICE |
| PURCHASE DATE AND TIME |
| . . . . . |

| REFERENCE LIST REGISTRATION HISTORY DB |
|---|
| USER ID |
| ITEM ID |
| ITEM CODE |
| ITEM NAME |
| GENRE ID |
| SHOP ID |
| REGISTRATION DATE AND TIMEE |
| . . . . . |

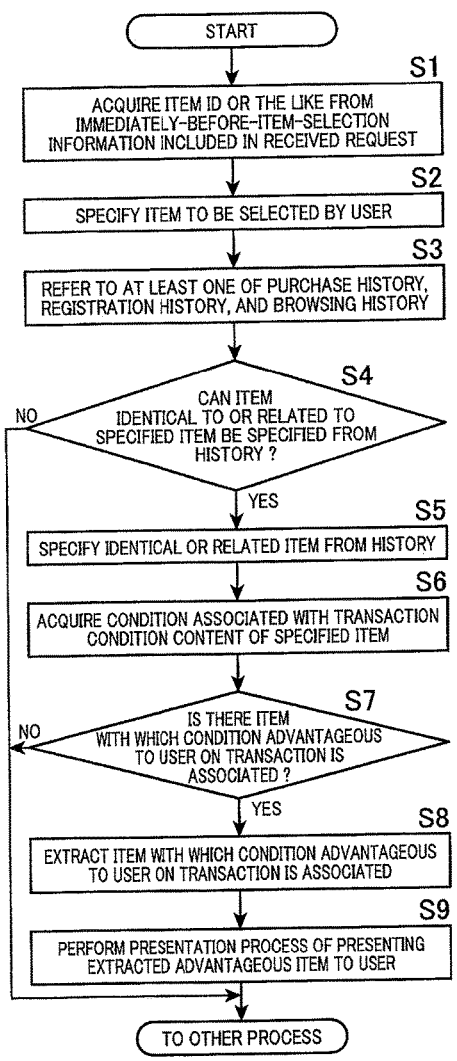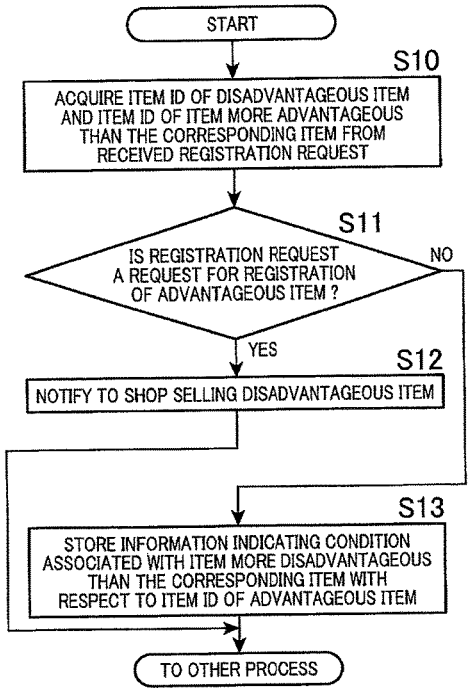

FIG.7

ITEM TO BE SELECTED BY USER

| ITEM NAME | GENRE | ITEM PRICE | POINT GRANTING RATE → SCORE | NUMBER OF ITEMS IN STOCK → SCORE | NUMBER OF DAYS REQUIRED FOR DELIVERY → SCORE | DELIVERY METHOD → SCORE | TOTAL SCORE |
|---|---|---|---|---|---|---|---|
| Food-abc | FOOD | 1,300 YEN→19 | 5% → 1 | 5 ITEMS → 10 | 3 DAYS → 2 | NO SAME-DAY DELIVERY → 0 | 32 POINTS |

ITEM SPECIFIED IN STEP S5

| ITEM NAME | GENRE | ITEM PRICE | POINT GRANTING RATE → SCORE | NUMBER OF ITEMS IN STOCK → SCORE | NUMBER OF DAYS REQUIRED FOR DELIVERY → SCORE | DELIVERY METHOD → SCORE | TOTAL SCORE |
|---|---|---|---|---|---|---|---|
| Food-abc | FOOD | 1,000 YEN→22 | 5% → 1 | 1 ITEM → 2 | 5 DAYS → 0 | NO SAME-DAY DELIVERY → 0 | 25 POINTS |
| Food-stu | FOOD | 1,100 YEN→21 | 3% → 0 | 1 ITEM → 2 | 2 DAYS → 4 | SAME-DAY DELIVERY → 6 | 33 POINTS ←ADVANTAGEOUS ITEM |
| Food-123 | FOOD | 1,200 YEN→20 | 5% → 1 | 0 ITEM → 0 | 3 DAYS → 2 | NO SAME-DAY DELIVERY → 0 | 23 POINTS |
| Food-xyz | FOOD | 1,500 YEN→17 | 10% → 5 | 3 ITEMS → 6 | 5 DAYS → 0 | NO SAME-DAY DELIVERY → 0 | 28 POINTS |
| Food-456 | FOOD | 1,800 YEN→14 | 5% → 1 | 4 ITEMS → 7 | 3 DAYS → 2 | NO SAME-DAY DELIVERY → 0 | 23 POINTS |
| Food-xyz | FOOD | 2,200 YEN→10 | 5% → 1 | 4 ITEMS → 7 | 2 DAYS → 4 | NO SAME-DAY DELIVERY → 0 | 22 POINTS |

APPARATUS AND METHOD FOR INFORMATION PROCESSING AND RECORDING

CROSS REFERENCE TO RELATED APPLICATIONS

This application is a National Stage of International Application No. PCT/JP2012/067047, filed Jul. 4, 2012, claiming priority from Japanese Patent Application No. 2011-258230, filed Nov. 25, 2011, the contents of all of which are incorporated herein by reference in their entirety.

TECHNICAL FIELD

The present invention relates to the technical field of information processing apparatuses or the like which can provide useful information when a user attempts to select a transaction object, for example, in a web site capable of providing information.

BACKGROUND ART

Conventionally, there have been known web sites that are capable of providing information on transaction of transaction objects (e.g., purchase of items). In such web sites, for example, there is a function of automatically registering information on items purchased by a user as a purchase history, a function of registering information on items in a predetermined reference list by selecting a user's favorite (interested) items, or the like. Herein, the reference list is, for example, a list that holds a reference to information on transaction objects. As an example of a function of registering information in such a reference list, a favorite registration or a bookmark registration is known. This can allow a user to easily access the information on the transaction objects from the reference list.

Meanwhile, as the number of registrations of the transaction objects (e.g., the number of bookmark entries) is increased, there is a problem that it is difficult to search for and designate a web page a user wants to see. In order to solve this problem, Patent Literature 1 proposes a technique that can rearrange bookmark entries in order of reference time, based on reference date and time information.

PRIOR ART LITERATURE

Patent Literature

Patent Literature 1: JP 10-334120 A

SUMMARY OF THE INVENTION

Problem to be Solved by the Invention

However, if the number of registrations is increased as described above, it is difficult for a user to remember all items registered in a purchase history or a reference list, even though bookmark entries are rearranged by the method proposed in Patent Literature 1. Therefore, for example, there is a problem that more disadvantageous items are purchased or are registered in the reference list even though more advantageous (profitable) items are present among items purchased in the past time by the user or items registered in the reference list.

Therefore, the present invention has been made in view of the above problems and is directed to provide an information processing apparatus, an information processing method, an information processing program, and a recording medium storing thereon the information processing program, which can prevent a transaction disadvantageous to a user or registration of disadvantageous transaction objects.

Means for Solving the Problem

In order to solve the above problem, the invention according to claim 1 is an information processing apparatus, comprising:

a specifying means that specifies a transaction object to be selected by a user;

an extracting means that extracts a transaction object, which is identical to or related to the transaction object specified by the specifying means and with which a condition more advantageous to the user on transaction than the transaction object specified by the specifying means is associated, from a storing means that stores information on transaction objects referred to in a past time by the user; and a presenting means that presents the transaction object extracted by the extracting means, to the user.

According to this invention, it is possible to notify the presence of a transaction object more advantageous than a transaction object to be selected by the user among transaction objects referred to in the past time by the user, and to prevent a transaction disadvantageous to the user or registration of disadvantageous transaction objects. Also, it is possible to prevent a transaction object disadvantageous on transaction from being registered in, for example, the reference list. Therefore, a process of deleting the "transaction object disadvantageous on transaction" from the reference list can be reduced, thereby reducing a system load.

The invention according to claim 2 is the information processing apparatus according to claim 1, further comprising:

a first limiting means that limits the presentation of the transaction objects referred to by the user within a predetermined past time from a present time among the transaction objects in the storing means.

According to this invention, it is possible to prevent transaction objects from being presented to the user beyond necessity, and it is possible to prevent the user from becoming complex or to prevent the user from being confused. Also, since it is possible to prevent transaction objects from being presented beyond necessity, a request for data related to the corresponding transaction object can be reduced, thereby reducing a system load.

The invention according to claim 3 is the information processing apparatus according to claim 1, further comprising:

a first limiting means that limits the presentation of the transaction objects within a predetermined number of cases retroactively to a past time from a present time among the transaction objects in the storing means.

According to this invention, it is possible to prevent transaction objects from being presented to the user beyond necessity, and it is possible to prevent the user from becoming complex or to prevent the user from being confused. Also, since it is possible to prevent transaction objects from being presented beyond necessity, a request for data related to the corresponding transaction object can be reduced, thereby reducing a system load.

The invention according to claim 4 is the information processing apparatus according to any one of claims 1 to 3, further comprising:

a second limiting means that limits the presentation of a second transaction object in a case where a condition more disadvantageous to the user on transaction than the second transaction object is associated with a third transaction object and a condition more advantageous to the user on transaction than a first transaction object is associated with the third transaction object, when the third transaction object to be newly selected by the user is specified by the specifying means after the first transaction object is selected by the user, even though the second transaction object associated with a condition more advantageous to the user on transaction than the first transaction object specified by the specifying means is presented to the user by the presenting means.

According to this invention, it is possible to prevent transaction objects from being presented to the user beyond necessity, and it is possible to prevent the user from becoming complex or to prevent the user from being confused.

The invention according to claim 5 is the information processing apparatus according to any one of claims 1 to 4, further comprising:

a notifying means that, when the transaction object presented by the presenting means is selected by the user, notifies a provider, which provides the transaction object specified by the specifying means, of information indicating the selection of the transaction object presented by the presenting means, instead of the transaction object.

According to this invention, the provider having received the notification can quickly grasp whether the provided transaction object by the provider loses to other transaction objects.

The invention according to claim 6 is the information processing apparatus according to any one of claims 1 to 5, wherein the information on the transaction object is included in at least one history of a transaction history of transaction objects on which the user has conducted transaction, a registration history of transaction objects registered in a predetermined reference list by the user, and a browsing history of transaction objects arranged in a page browsed by the user, and the specifying means specifies the transaction objects to be selected for the transaction or the registration.

According to this invention, the information on the transaction objects referred to in the past time by the user can be quickly confirmed by using at least one history of the transaction history, the registration history, and the browsing history of the user.

The invention according to claim 7 is the information processing apparatus according to claim 6, wherein when the transaction object to be selected for the transaction is specified, the extracting means preferentially extracts, from the transaction history, a transaction object which is identical to or related to the specified transaction object and with which a condition more advantageous to the user on transaction than the corresponding transaction object is associated.

According to this invention, when the user attempts to conduct the transaction of the transaction object, transaction objects more advantageous than the corresponding transaction object can be more effectively presented to the user.

The invention according to claim 8 is the information processing apparatus according to claim 6, wherein when the transaction object to be selected for the registration is specified, the extracting means preferentially extracts, from the registration history, a transaction object which is identical to or related to the specified transaction object and with which a condition more advantageous to the user on transaction than the corresponding transaction object is associated.

According to this invention, when the user attempts to register the transaction object in the reference list, transaction objects more advantageous than the corresponding transaction object can be more effectively presented to the user.

The invention according to claim 9 is the information processing apparatus according to any one of claims 1 to 8, wherein a condition is associated with each of the transaction objects with respect to one or more contents, the information processing apparatus further comprises an aggregating means that aggregates values corresponding to conditions associated with the one or more contents among the contents associated with the transaction object, and the extracting means extracts the transaction object, which is associated with a condition more advantageous to the user on transaction than the transaction object specified by the specifying means, by comparing a value which is aggregated by the aggregating means with respect to the transaction object specified by the specifying means, with a value which is aggregated by the aggregating means with respect to the transaction object that is identical to or related to the specified transaction object and is stored in the storing means.

According to this invention, from the viewpoint that considers a plurality of different contents in their entirety, it is possible to notify the user of the presence of the transaction object more advantageous than the transaction object to be selected by the user.

The invention according to claim 10 is the information processing apparatus according to claim 9, further comprising:

a content specifying means that specifies a content which the user regards as important among the plurality of types of contents, based on information on transaction objects referred to in the past time by the user, wherein the aggregating means performs the aggregate by setting a weight for a value corresponding to a condition associated with the content specified by the content specifying means, to be higher than a weight for a value corresponding to a condition associated with a content unspecified by the content specifying means.

According to this invention, from the viewpoint of the content the user regards as important, it is possible to notify the user of the presence of the transaction object more advantageous than the transaction object to be selected by the user.

The invention according to claim 11 is an information processing method, which is performed by a computer, comprising:

a specifying step of specifying a transaction object to be selected by a user;

an extracting step of extracting a transaction object, which is identical to or related to the transaction object specified in the specifying step and with which a condition more advantageous to the user on transaction than the transaction object specified in the specifying step is associated, from a storing means that stores information on transaction objects referred to in a past time by the user; and a presenting step of presenting the transaction object extracted in the extracting step, to the user.

The invention according to claim 12 is an information processing program, which causes a computer to function as:

a specifying means that specifies a transaction object to be selected by a user;

an extracting means that extracts a transaction object, which is identical to or related to the transaction object specified by the specifying means and with which a condition more advantageous to the user on transaction than the transaction object specified by the specifying means is associated, from a storing means that stores information on transaction objects referred to in a past time by the user; and a presenting means that presents the extracted transaction object extracted by the extracting means, to the user.

The invention according to claim 13 is a recording medium computer-readably storing thereon an information processing program, which causes a computer to function as:

a specifying means that specifies a transaction object to be selected by a user;

an extracting means that extracts a transaction object, which is identical to or related to the transaction object specified by the specifying means and with which a condition more advantageous to the user on transaction than the transaction object specified by the specifying means is associated, from a storing means that stores information on transaction objects referred to in a past time by the user; and a presenting means that presents the transaction object extracted by the extracting means, to the user.

Advantageous Effects of the Invention

According to the present invention, it is possible to notify the presence of the transaction object more advantageous than the transaction object to be selected by the user among transaction objects referred to in the past time by the user, and to prevent a transaction disadvantageous to the user or registration of disadvantageous transaction objects.

BRIEF DESCRIPTION OF THE DRAWINGS

FIG. 2 is a block diagram illustrating an example of a schematic configuration of an information providing server 1 according to the present embodiment.

FIG. 3A to FIG. 3G are diagrams illustrating an example of contents recorded in databases.

FIG. 4A is a flowchart illustrating an information providing process in a system control unit 14 of the information providing server 1, and FIG. 4B is a flowchart illustrating an item registration process in the system control unit 14 of the information providing server 1.

FIG. 7 is a diagram illustrating the result obtained by aggregating scores corresponding to a condition associated with each transaction condition content of a specified item.

MODE FOR CARRYING OUT THE INVENTION

Hereinafter, an embodiment of the present invention will be described in detail with reference to the drawings. The embodiment described below is an embodiment in a case where the present invention is applied to an information providing system.

[1. Configuration and Functional Overview of Information Providing System]

Figure 1:
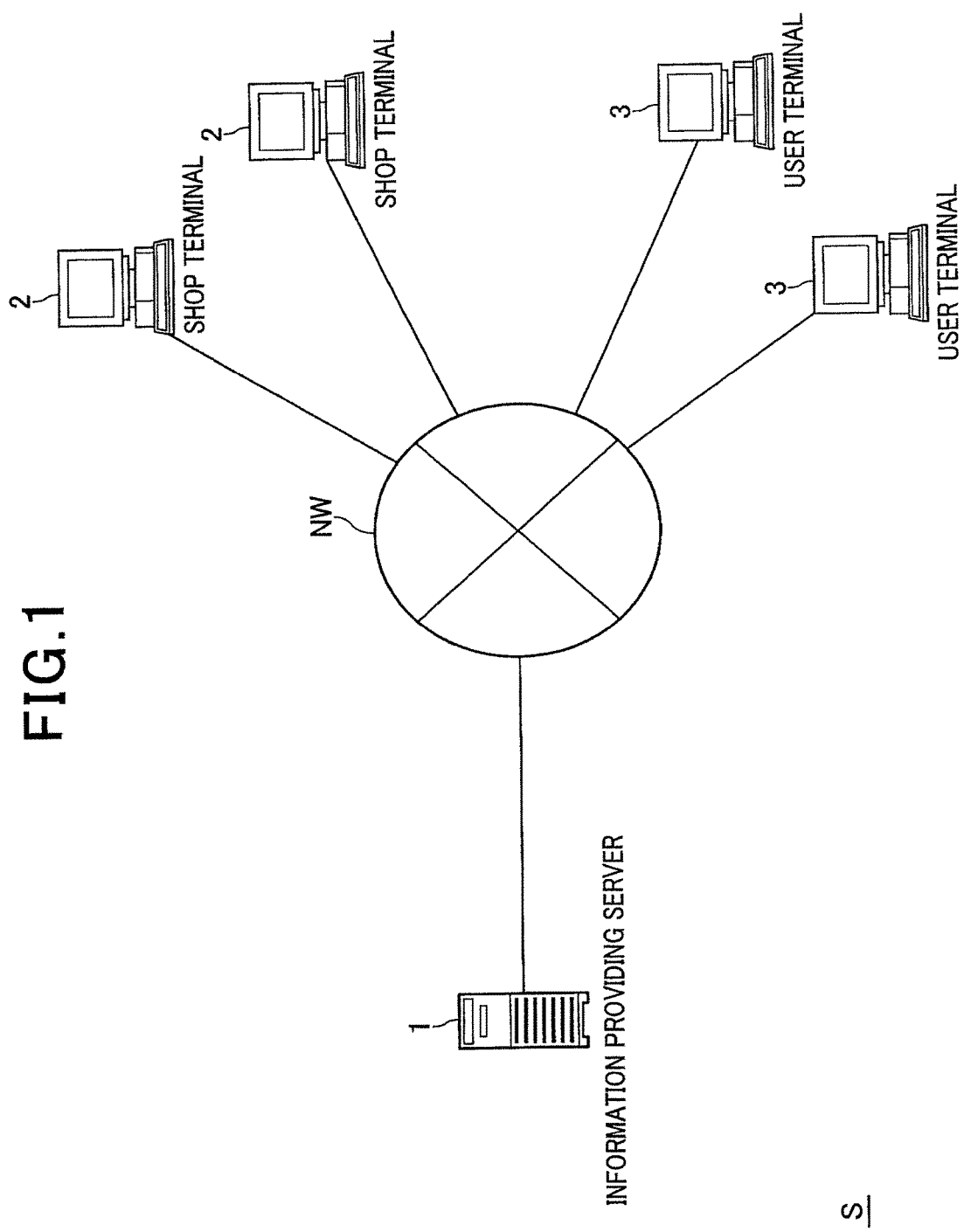
FIG. 1 is a diagram illustrating an example of a schematic configuration of an information providing system S according to the present embodiment.

First, the configuration of the information providing system S according to the present embodiment will be described with reference to FIG. 1. FIG. 1 is a diagram illustrating an example of a schematic configuration of an information providing system S according to the present embodiment.

As illustrated in FIG. 1, the information providing system S is configured to include an information providing server 1, a plurality of shop terminals 2, and a plurality of user terminals 3. The information providing server 1, and each shop terminal 2 and each user terminal 3 are capable of mutually transmitting and receiving data through a network NW by using, for example, TCP/IP as a communication protocol. Also, the network NW is constructed by, for example, the Internet, a dedicated communication line (e.g., community antenna television (CATV) line), a mobile communication network (including a base station and the like), a gateway, or the like.

The information providing server 1 (example of an information processing apparatus of the present invention) is a server apparatus that performs a variety of processing related to an online mall or an Internet auction capable of purchase (example of transaction) of items (example of transaction objects). Users can purchase desired items from desired shops by using the online mall. Also, the user can exhibit an item in an auction and bid for an exhibited item. In response to a request from the shop terminals 2 or the user terminals 3, for example, the information providing server 1, transmits a web page of an online mall or an auction and performs processes associated with retrieving, purchasing, exhibition, bidding, and the like of items.

The shop terminal 2 is a terminal device that is used by an employee or the like of a shop open in an online mall. The shop terminal 2 is used to, for example, register information on items for sale in the online mall and confirm contents of ordered items. Also, the shop terminal 2 accesses the information providing server 1 based on an operation from an employee or the like, and receives and displays a web page from the information providing server 1. Software such as a web browser or an email client is incorporated into the shop terminal 2. As an example of the shop terminal 2, a personal computer or the like is used.

The user terminal 3 is a terminal device of a user who uses the online mall or the auction. The user terminal 3 accesses the information providing server 1 based on an operation of a user, and receives and displays a web page from the information providing server 1. Software such as a web browser or an email client is incorporated into the user terminal 3. As an example of the user terminal 3, a personal computer, a personal digital assistant (PDA), a mobile information terminal such as a smartphone, a mobile phone, a portable game machine, or the like is used.

Next, configuration of the information providing server 1 will be described with reference to FIG. 2 and FIGS. 3A to 3G.

FIG. 2 is a block diagram illustrating an example of a schematic configuration of the information providing server 1 according to the present embodiment. As illustrated in FIG. 2, the information providing server 1 includes a communication unit 11, a storage unit 12, an input/output interface 13, and a system control unit 14. The system control unit 14 and the input/output interface 13 are connected through a system bus 15. Also, the information providing server 1 includes a plurality of server devices, such as a web server, an application server, and a database server, and such servers are mutually connected by a LAN or the like.

The communication unit 11 is connected to a network NW to control communication state of the shop terminals 2, the user terminals 3, and the like.

The storage unit 12 (example of a storing means according to the present invention) is configured by, for example, a hard disk drive or the like. Also, structured document (e.g., hypertext markup language (HTML) document, XHTML document, or the like) files, image data, and the like constituting a web page displayed in the user terminal 3 are stored in the storage unit 12.

Also, databases such as a membership information DB (database) 12a, a genre information DB 12b, a shop information DB 12c, an item information DB 12d, a browsing history DB 12e, a purchase history (example of transaction history) DB 12f, a reference list registration history DB 12g, and the like are constructed in the storage unit 12. Also, all or part of such various DBs are provided in a storing means of a predetermined server that can be accessed by the information providing server 1.

FIG. 3A is a diagram illustrating an example of contents recorded in the membership information DB 12a. Membership information of users registered as members is recorded in the membership information DB 12a. Specifically, attributes of a user, such as a user ID, a password, a nickname, a name, a date of birth, a gender, a zip code, an address, a telephone number, and an email address are recorded in the membership information DB 12a in association with each user. The user ID is identification information unique to each user. The user ID and the password are authentication information used for a login process (user authentication process).

FIG. 3B is a diagram illustrating an example of contents recorded in the genre information DB 12b. Genre information on a genre (category) of an item is recorded in the genre information DB 12b. Specifically, attributes of a genre, such as a genre ID, a genre name, a genre level, a parent genre ID, and a child genre ID list are recorded in the genre information DB 12b in association with each genre. The genre information is set by, for example, an administrator or the like of an online mall. The genre ID is identification information unique to each genre. The genre of the item is hierarchically defined by a tree structure, and each node of the tree structure corresponds to a genre. Therefore, the depth of the node corresponds to the level (class) of the genre corresponding to the node. The parent genre ID is a genre ID of a parent genre of a genre defined by genre information. The child genre ID list is a list of genre IDs of child genres of a genre defined by genre information. The child genre ID list is set when the genre defined by the genre information includes child genres.

FIG. 3C is a diagram illustrating an example of contents recorded in the shop information DB 12c. Shop information on a shop that is open at an online mall is recorded in the shop information DB 12c. The shop is an example of a provider providing an item as a transaction object. Specifically, attributes of a shop, such as a shop ID, a password, a shop name, a zip code, an address, a telephone number, an email address, and evaluation (review) information on a shop, are recorded in the shop information DB 12c in association with each shop. Herein, the shop ID is identification information unique to each shop. The shop ID and the password are authentication information used for a login process. The evaluation information on the shop is represented by an evaluation score of, for example, from 1 to 5.

As the evaluation score is higher, the evaluation is higher. For example, the evaluation score is an average of evaluation scores input (on a web page) by each user having purchased an item from a shop. A shop having a higher evaluation score can be said to be a shop having a higher level of satisfaction with a user.

FIG. 3D is a diagram illustrating an example of contents recorded in the item information DB 12d. Item information on items exhibited in an online mall is recorded in the item information DB 12d. Specifically, information such as an item ID, a shop ID of a shop selling an item, an item code, a genre ID of a genre to which an item belongs, a related item list, an item name, a uniform resource locator (URL) of an item image, an item description, number of items, an item price, a launch time, a version number of an item, a granted point (point granting rate), number of items in stock, a payment method, a delivery method, number of days required for delivery, and a delivery fee is recorded in the item information DB 12d in association with each item and each shop. Herein, the item ID is identification information unique to each item. Even when items are identical, item IDs are different if shops selling the items are different. The item code is a code number for identifying an item. The item code is, for example, a Japanese Article Number (JAN) code. Even when shops selling items are different, item codes are identical if the items are identical. The genre ID of the genre to which the item belongs is, for example, a genre ID of each genre at the highest level 1 to the lowest level 5.

Also, the related item list is a list to register information of items related to exhibited items (hereinafter, referred to as "related item information"). For example, item codes of the related items are included in the related item information. Also, an item name and a genre ID may be included in the related item information. Also, when there is no related item, related item information is not registered in the related item list (NULL). Examples of the items related to the exhibited items include items whose item names are partially matched between the exhibited items and whose genres are matched. For example, the determination as to whether the item names are matched is made in such a manner that the system control unit 14 determines whether keywords or patterns extracted by data mining of item names are matched. For example, when an item number (e.g., ABC-301 type) composed of alphabets and numbers is included in an item name, the keyword corresponds to the alphabet part (e.g., ABC) therein. Also, for example, the determination as to whether the genres are matched is made in such a manner that the system control unit 14 determines whether genres up to a predetermined level (e.g., the lowest level 5) among the highest level 1 to the lowest level 5 are matched. Such determinations and the registration to the related item list are performed, for example, every predetermined time. Also, for example, the items related to the exhibited items may be items whose item names are partially matched between the exhibited items, regardless of whether the genres are matched.

Also, in a case of a set item in which a plurality of items is sold by a set (e.g., books of Volume 1 to Volume 10), the number of the items is the number of items included in one set, and the item price in this case is a price of the set item per one set. On the other hand, when the item is not the set item, the number of the items is one, and the item price in this case is a price of the corresponding one item. Also, there is an item whose item weight instead of the number of the items is recorded (e.g., in a case of rice, one bag of 5 kg). The version number of the item is a number assigned when an item has been revised, and indicates "which version" of "when". The granted point is a point granted to a user having purchased an item. Also, the point granting rate is a rate indicating what point is granted to a price of a purchased item (granted to a user having purchased an item). For example, when 1 point is granted for 1000 yen, a point granting rate is 0.1%. Such points can be used for a user to make settlement (payment) for an item. Therefore, it can be said that an item, of which the point granting rate is higher, is an item profitable to a user. The delivery method includes a mail service, a home delivery service, a same-day delivery, a postal service, or the like. A delivery fee and the number of days required until an arrival of an item are different according to the delivery method. Also, the presence or absence of compensation or the amount of compensation are different according to the delivery method. Also, in a case of the same-day delivery, the number of days required for delivery is one day in principle.

FIG. 3E is a diagram illustrating an example of contents recorded in the browsing history DB 12*e*. A browsing history of items arranged in a page browsed by a user (web page in which item information is posted) is recorded in the browsing history DB 12*e*. Specifically, information such as a user ID of a user having browsed a page, a URL of the browsed page, an item ID of an item arranged in the browsed page, an item code, an item name, a genre ID, a shop ID of a shop selling (providing) the corresponding item, and a browsing date and time is recorded in the browsing history DB 12*e* in association with each user. Also, the browsing history is recorded in a case where a web page is displayed on the user terminal 3 by an operation of a user who logs in. Alternatively, the browsing history stored by the web browser of the user terminal 3 may be acquired by the information providing server 1 when the user of the user terminal 3 logs in, and be registered.

FIG. 3F is a diagram illustrating an example of contents recorded in the purchase history DB 12*f*. A purchase history of an item purchased by a user (example of a transaction history) is recorded in the purchase history DB 12*f*. Specifically, information such as a user ID of a user having purchased an item, an item ID of the purchased item, an item code, an item name, a genre ID, a shop ID of a shop selling the corresponding item (shop of a purchase destination), number of purchase, a purchase price, and a purchase date and time (order date and time) is recorded in the purchase history DB 12*f* in association with each user. Also, the purchase history is recorded in a case where an item purchase procedure is completed by an operation of a user in a web page for performing an item purchase procedure.

FIG. 3G is a diagram illustrating an example of contents recorded in the reference list registration history DB 12*g*. A registration history of an item registered in a predetermined reference list by a user (e.g., an item ID is registered) is recorded in the reference list registration history DB 12*g*. Specifically, information such as a user ID of a user registered in the reference list, an item ID of an item registered in the reference list, an item code, an item name, a genre ID, a shop ID of a shop selling the corresponding item, and a registration date and time is recorded in the reference list registration history DB 12*g* in association with each user. Also, examples of the predetermined reference list include a favorite list, bookmark list, a shopping cart list, a watch list, and the like. For example, the user may register a favorite item or an interested item in such reference lists as a purchase object or an object to be recommended to other user. Also, the registration history is recorded in a case where an item is registered in the predetermined reference list by an operation of a user who logs in.

Furthermore, various programs such as an operating system (OS), a world wide web (WWW) server program, a database management system (DBMS), and an information processing program of the present invention, and various setting data and tables are stored in the storage unit 12. Also, the various programs may be acquired from another server device through the network NW or may be recorded in a recording medium such as a digital versatile disc (DVD) and read by a drive device.

The input/output interface 13 is configured to perform an interface process between the communication unit 11 and the storage unit 12, and the system control unit 14.

The system control unit 14 is configured to include a CPU 14*a*, a read only memory (ROM) 14*b*, a random access memory (RAM) 14*c*, and the like. Therefore, in the system control unit 14, the CPU 14*a* as a computer reads the various programs to function as a specifying means, an extracting means, a presenting means, a first limiting means, a second limiting means, a notifying means, a aggregating means, and a content specifying means according to the present invention (i.e., the information processing program of the present invention causes the CPU 14*a* to perform the above-described means) and performs processes to be described below.

In the above configuration, the information providing server 1 is configured to extract an item, which is identical to or related to an item to be selected by the user of the user terminal 3 and with which a more advantageous condition than that of the corresponding item is associated, from the storage unit 12 storing information on an item referred to in the past time by a user, and present the extracted item (hereinafter, referred to as "advantageous item") to the user. Therefore, it is possible to present the user with the presence of an advantageous item referred to in the past time, and to prevent a user from the disadvantageous transaction or the registration of disadvantageous items.

Also, in the present embodiment, a condition for each of one or more transaction condition contents (in other words, a specific content associated with transaction condition contents) is associated with respect to each item. As an example of the transaction condition contents, there is a plurality of types such as the number of items, the item price, the launch time, the version number of the item, the granted point (point granting rate), the number of items in stock, the payment method, the delivery method, the number of days required for delivery, the delivery fee, and the evaluation information on the shop selling the item as described above. However, among the plurality of types of transaction condition contents, there is an item associated with all transaction condition contents, and there is an item associated with a part (at least one) of the transaction condition contents. Also, in the present embodiment, information included in at least one history of the browsing history, the purchase history, and the registration history described above corresponds to an example of the information on the item referred to in the past time by the user. An item presented in such a history can be said to be an item referred to and seen in the past at least one time by the user.

[2. Operation of Information Providing System]

Figures 5A, 5B:
FIG. 5A and FIG. 5B are diagrams illustrating a display example of a web page posting a list of items.
Figure 6:
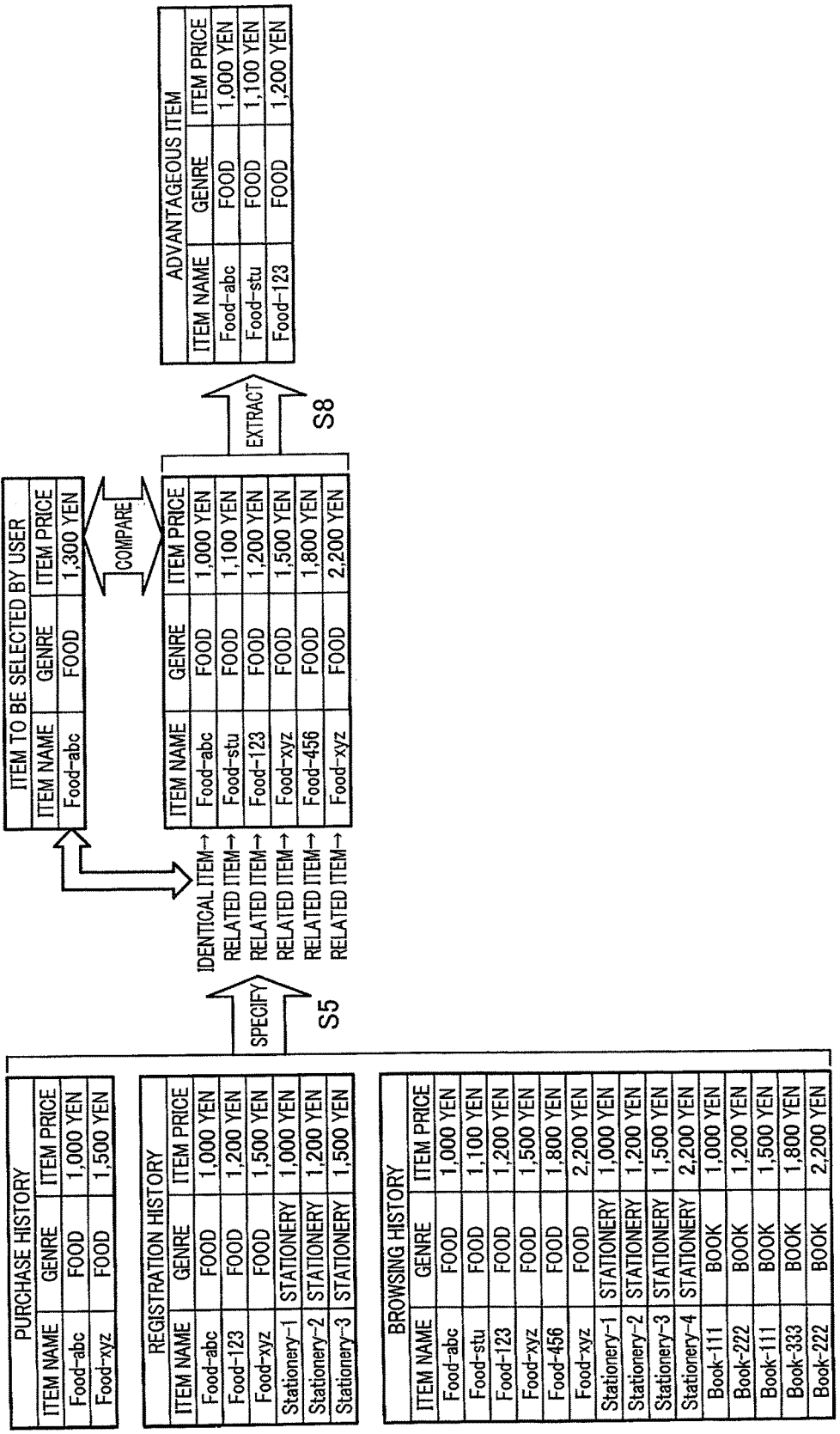
FIG. 6 is a diagram illustrating a situation in which items more advantageous than an item to be selected by a user are extracted.

Next, the operation of the information providing system S will be described with reference to FIGS. 4 to 6. FIG. 4A is a flowchart illustrating an information providing process in the system control unit 14 of the information providing server 1, and FIG. 4B is a flowchart illustrating an item registration process in the system control unit 14 of the information providing server 1. FIG. 5A and FIG. 5B are diagrams illustrating a display example of a web page posting a list of items. FIG. 6 is a diagram illustrating a situation in which more advantageous items than an item to be selected by a user are extracted.

Also, in the following description, it is assumed that the user terminal 3 establishes a session with the information providing server 1, acquires a web page from the information providing server 1 and displays the web page as illustrated in FIG. 5A. Also, it is assumed that the user of the user terminal 3 logs in through the login process of the information providing server 1. Therefore, a cookie (including a user ID of the user) issued by the information providing server 1 is stored in the user terminal 3. Such a cookie is added to a request to be transmitted from the user terminal 3 to the information providing server 1.

In each item included in the list of items displayed in the web page illustrated in FIG. 5A, a select button 51 for selecting an item and registering the item in a bookmark list is displayed in association therewith. The select button 51 is configured by, for example, an image or a text. Also, a link (hyperlink) to the information providing server 1 is set in the select button 51. When the select button 51 is selected by the user, this is detected by the web browser, and a request to register an item associated with the select button 51 in the information providing server 1 is transmitted. As a result, the selected item is registered in the bookmark list. Herein, for example, the selection of the item (i.e., the selection of the select button 51) is performed by a user's selection operation (e.g., by pressing (clicking) a button of the mouse) in a state in which a pointer 52 of a pointing device (e.g., a mouse) of the user terminal 3 indicates the select button 51 (e.g., the pointer 52 is mouseover (overlapped) within a display range of the select button 51). On the other hand, although the pointer 52 of the pointing device of the user terminal 3 indicates the select button 51, a state in which the user's selection operation has not be performed is defined as an "item is to be selected" state. In the present embodiment, when the "item is to be selected" state is detected by the web browser, it is configured such that information indicating that the item is to be selected (hereinafter, referred to as "immediately-before-item-selection information") is transmitted to the information providing server 1, and information of an advantageous item from the information providing server 1 is pop-up displayed in the vicinity of the select button 51 or on (i.e., overlapped with) the select button 51. This is realized by definition within a structured document constituting a web page, for example, in a script (e.g., JavaScript®). Also, for example, display data including the select button 51 associated with each item is described as an element organized for each item by a div tag (<div> . . . </div>) in the structured document constituting the web page. Also, for example, the vicinity of the select button 51 refers to a position within predetermined pixels (e.g., 30 pixels) from a periphery of a display area of the select button 51. This may be enough as long as it is a position which is immediately visible at a glance (in other words, a position at which the selection of the select button 51 can be reluctant) when the user gazes at the select button 51. Also, the display data includes, for example, an item ID of an item, a shop ID of a shop selling the item, and a button attribute of the select button 51. The button attribute indicates whether the selection is done for the purchase of the item or whether the selection is done for the registration of the item to the reference list. The button attribute of the select button 51 illustrated in FIG. 5A indicates whether the selection is done for the registration of the item to the reference list. Also, the select button for the purchase of the item is provided as, for example, an "item order procedure" button in a web page for performing an item purchase procedure.

In the display state as illustrated in FIG. 5A, when the user operates the pointing device to cause the pointer 52 to indicate the select button 51 corresponding to an item of concern, the web browser of the user terminal 3 detects this and transmits a request including the above-described immediately-before-item-selection information to the information providing server 1. This request is transmitted to the information providing server 1 (e.g., transmitted by generation of an "onmouseover" event), for example, as an AJAX request. Also, the immediately-before-item-selection information includes, for example, information such as an item ID of the item, a shop ID, and a button attribute of the select button 51. Also, a cookie stored in the user terminal 3 by the user's login is added to the request.

Also, the "item is to be selected" state may be a state immediately before the pointer 52 indicates the select button 51 associated with the item, that is, a state in which the pointer 52 of the pointing device is positioned outside the display area of the select button 51 but within a neighboring range of the display area (the neighboring range is preset). In this case, when the pointer 52 of the pointing device is positioned within the neighboring range of the display area of the select button 51, the web browser of the user terminal 3 detects this and transmits a request including the immediately-before-item-selection information to the information providing server 1.

Thus, when receiving the request including the immediately-before-item-selection information from the user terminal 3, the information providing server 1 starts the process illustrated in FIG. 4A. In step S1 illustrated in FIG. 4A, the system control unit 14 of the information providing server 1 acquires information such as the item ID, the shop ID, and the button attribute from the immediately-before-item-selection information included in the received request.

Subsequently, the system control unit 14 specifies an item to be selected by the user, based on the item ID acquired in step S1 (step S2). Subsequently, the system control unit 14 refers to at least one history of the purchase history recorded in the purchase history DB 12f, the registration history recorded in the reference list registration history DB 12g, and the browsing history recorded in the browsing history DB 12e as the history of the user of the user terminal 3 having transmitted the request (i.e., history associated with the user ID added to the received request) (step S3). The system control unit 14 determines whether at least one of the item identical to the item specified in step S2 and the item associated with the item specified in step S2 can be specified from the history referred to in step S3 (step S4). When it is determined that the item cannot be specified from the history (step S4: NO), the process illustrated in FIG. 4A is ended. That is, in this case, since the item to be selected by the user is the most advantageous item, the presentation of the other advantageous items is not performed and the user can select the item to be selected with an easy mind.

On the other hand, when it is determined that the item can be specified from the history (step S4: YES), the system control unit 14 specifies the item from the history (e.g., specifies the item by the item ID) as illustrated in FIG. 6 (step S5). In the example illustrated in FIG. 6, six items are specified by the process of step S5. Herein, for example, when the item code identical to the item code of the item specified in step S2 (the entire item name and the genre may be identical) is included in at least one history of the purchase history, the registration history, and the browsing history, the item having the item code included in the corresponding history is specified as the item identical to the item specified in step S2. Also, when the shop selling the item specified in step S2 and the shop selling the same item as the corresponding item are identical to each other (shop IDs are identical to each other), it may be configured such that the same item as the item specified in step S2 is excluded from the specifying of step S3. On the other hand, the item related to the item specified in step S2 is specified as follows. That is, when the item related information (e.g., the item code (or the item name and the genre ID)) recorded in the related item list associated with the item ID of the item specified in step S2 (i.e., the related item list recorded in the item information DB 12d) is included in at least one of the purchase history, the registration history, and the browsing history, the item having the item related information included in the corresponding history is specified as the item related to the item specified in step S2.

Also, the system control unit 14 may be configured to determine a reference priority order of the history, based on the button attribute acquired in step S1, refer to the history according to the determined reference priority order, and determine whether the item can be specified from the referred history. For example, when the button attribute acquired in step S1 indicates the selection for the registration of the item to the reference list, the system control unit 14 determines the reference priority order in order of the registration history→the purchase history→the browsing history. First, the system control unit 14 determines whether the above-described item can be specified from the registration history with reference to the registration history according to the determined reference priority order. When it is determined that the corresponding item can be specified from the registration history, the system control unit 14 specifies the corresponding item from the registration history and proceeds to step S6. On the other hand, when it is determined that the corresponding item cannot be specified from the registration history, the system control unit 14 determines whether the above-described item can be specified from the purchase history with reference to the purchase history. When it is determined that the corresponding item can be specified from the purchase history, the system control unit 14 specifies the corresponding item from the purchase history and proceeds to step S6. On the other hand, when it is determined that the corresponding item cannot be specified from the purchase history, the system control unit 14 determines whether the above-described item can be specified from the browsing history with reference to the browsing history. When it is determined that the corresponding item can be specified from the browsing history, the system control unit 14 specifies the corresponding item from the browsing history and proceeds to step S6. On the other hand, when it is determined that the corresponding item cannot be specified from the browsing history, the system control unit 14 ends the process illustrated in FIG. 4A. According to this configuration, when a user attempts to register an item to the reference list, a more advantageous item than the corresponding item can be more effectively presented to the user.

On the other hand, for example, when the button attribute acquired in step S1 indicates the selection for the purchase of the item, the system control unit 14 determines the reference priority order in order of the purchase history→the registration history→the browsing history. First, the system control unit 14 determines whether the above-described item can be specified from the purchase history with reference to the purchase history according to the determined reference priority order. When it is determined that the corresponding item can be specified from the purchase history, the system control unit 14 specifies the corresponding item from the purchase history and proceeds to step S6. On the other hand, when it is determined that the corresponding item cannot be specified from the purchase history, the system control unit 14 determines whether the above-described item can be specified from the registration history with reference to the registration history. When it is determined that the corresponding item can be specified from the registration history, the system control unit 14 specifies the corresponding item from the registration history and proceeds to step S6. On the other hand, when the item cannot be specified from the registration history, it is the same as the case where the button attribute indicates the selection for the registration of the item to the reference list. According to this configuration, when a user attempts to purchase an item, a more advantageous item than the corresponding item can be more effectively presented to the user.

Also, for example, in step S5, the system control unit 14 may be configured to exclude an item referred to by a user from a specifying object within a predetermined past time (e.g., 2 weeks) from the present time (i.e., time when the process of step S5 is performed) among items of the history referred to in step S3. That is, the presentation of the item referred to by the user within the predetermined past time from the present time is limited. This is because if much time has not passed from the reference to the item, it is assumed that the user remembers the item. For example, when specifying the item from the purchase history, the system control unit 14 excludes the corresponding item from the specifying object if the purchase date and time of the corresponding item included in the purchase history is within the predetermined past time from the present time. Also, for example, when specifying the item from the registration history, the system control unit 14 excludes the corresponding item from the specifying object if the registration date and time of the corresponding item included in the registration history is within the predetermined past time from the present time. Also, for example, when specifying the item from the browsing history, the system control unit 14 excludes the corresponding item from the specifying object if the browsing date and time of the corresponding item included in the browsing history is within the predetermined past time from the present time. Therefore, it is possible to prevent the item from being presented to the user beyond necessity, and it is possible to prevent the user from becoming complex or to prevent the user from being confused. Also, since it is possible to prevent the item from being presented beyond necessity, a request for data related to the corresponding item can be reduced, thereby reducing a system load.

Also, for example, in step S5, the system control unit 14 may be configured to exclude items, which are within a predetermined number of cases (e.g., 30 cases) retroactively to the past time from the present time, from the specifying object among items of the history referred to in step S3 (e.g., OR condition with the configuration that excludes the items referred to by the user within a predetermined time from the present time). That is, the presentation of the items to the user within the predetermined number of cases retroactively to the past time from the present time is limited. Such items can be considered as items in which much time has not passed from the reference of the user. According to this configuration, it is possible to prevent the item from being presented to the user beyond necessity, and it is possible to prevent the user from becoming complex or to prevent the user from being confused. Also, since it is possible to prevent the item from being presented beyond necessity, a request for data related to the corresponding item can be reduced, thereby reducing a system load.

Subsequently, the system control unit 14 in step S6 acquires a condition associated with a transaction condition content to be compared among a plurality of types of transaction condition contents of the item specified in step S2, and a condition associated with a transaction condition content to be compared among a plurality of types of transaction condition contents of the item specified in step S5, from at least one of the item information DB 12d and the shop information DB 12c, for example, by using each item ID as a key (step S6). Herein, one or more transaction condition contents to be compared is arbitrarily set by, for example, an administrator or a user of an online mall. For example, when the transaction condition content to be compared is an item price, a condition associated with the item price of the specified item (condition associated with the item: for example, 1,300 yen) is acquired. Also, in the example illustrated in FIG. 6A, the case where the transaction condition content to be compared is the item price is described, but there is also a case where a plurality of transaction condition contents to be compared is set (e.g., an item price and number of items in stock, and the like).

Subsequently, the system control unit 14 compares the respective conditions acquired in step S6 (i.e., the condition associated with the item specified in step S2 and the condition associated with the item specified in step S5), and determines whether the advantageous item, with which the condition more advantageous to the user on transaction than the item specified in step S2 is associated, is present in the items specified in step S5 (step S7). When it is determined that the item, with which the condition more advantageous to the user on transaction is associated, is not present in the items specified in step S5 (step S7: NO), the system control unit 14 ends the process illustrated in FIG. 4A. That is, in this case, since the item to be selected by the user is the most advantageous item, the presentation of the other advantageous items is not performed and the user can select the item to be selected with an easy mind.

On the other hand, when it is determined that the item, with which the condition more advantageous to the user on transaction is associated, is present in the items specified in step S5 (step S7: YES), the system control unit 14 extracts the item, with which the condition more advantageous to the user on transaction than the item specified in step S2, is associated, from the items specified in step S5 (e.g., extracts an item ID, an item name, or the like of the advantageous item) (step S8). Herein, which condition is advantageous to the user on transaction is preset with respect to each transaction condition content. For example, when the transaction condition content to be compared is an item price, an item with a low item price rather than an item with a high item price is set to be determined as the advantageous item with which the condition advantageous to the user on transaction is associated. In the example illustrated in FIG. 6, three items are extracted as the advantageous items with which the condition more advantageous to the user on transaction than the item to be selected by the user (item name: Food-abc, item price: 1,300 yen) is associated. Also, it may be configured such that a delivery fee of each item is added to an item price of each item, and the added total sum is compared as a condition of each item. Also, when the item prices are equal to each other, an item of which the quantity is larger (e.g., books of volume 1 to volume 15) rather than an item of which the quantity is smaller (e.g., book of volume 1 to volume 10) may be set to be determined as the advantageous item with which the condition advantageous to the user on transaction is associated.

For example, when the transaction condition content to be compared is a point granting rate, an item with a high point granting rate rather than an item with a low point granting rate is set to be determined as the advantageous item with which the condition advantageous to the user on transaction is associated. Also, when the transaction condition content to be compared is the number of items in stock, an item with a large number in stock rather than an item with a small number in stock is set to be determined as the advantageous item with which the condition advantageous to the user on transaction is associated. Also, when the transaction condition content to be compared is evaluation information of a shop selling an item, an item sold at a shop having high evaluation rather than an item sold at a shop having low evaluation is set to be determined as the advantageous item with which the condition advantageous to the user on transaction is associated. Also, when the transaction condition content to be compared is a release period, an item of which the release time is more recent is set to be determined as the advantageous item with which the condition advantageous to the user on transaction is associated. Also, when the transaction condition content to be compared is a version number, an item with a large version number rather than an item with a small version number is set to be determined as the advantageous item with which the condition advantageous to the user on transaction is associated. Also, when the transaction condition content to be compared is the number of days required for delivery, an item with a small number of days required for delivery rather than an item with a large number of days required for delivery is set to be determined as the advantageous item with which the condition advantageous to the user on transaction is associated. Also, in a case where a plurality of transaction condition contents to be compared is set, a method of determining a condition advantageous to the user on transaction (i.e., a condition of combination) will be described below.

Meanwhile, when the transaction condition content to be compared is a certain condition like a delivery method, there is also a transaction condition content difficult to uniformly determine what is advantageous to the user on transaction. For example, when the condition associated with the delivery method compares the mail service and the same-day delivery, the same-day delivery is advantageous (favorable) on transaction to a user who wants an item to be quickly delivered, while the mail service is advantageous on transaction to a user who wants an item to be delivered at a cheap delivery charge. Therefore, in this case, for example, which condition is advantageous to the user on transaction may be configured to be set based on a statistical result obtained when the system control unit 14 takes statistics of conditions selected in the past time by the user with reference to the purchase history of the user. For example, a condition selected most frequently by the user may be set as the condition advantageous to the user on transaction. Therefore, for example, when the transaction condition content to be compared is the delivery method, an item with which the same-day delivery is associated as the set delivery method rather than an item with which the same-day delivery is not associated may be set to be determined as the advantageous item with which the condition advantageous to the user on transaction is associated.

Subsequently, the system control unit 14 performs a presentation process of presenting the user the advantageous item extracted in step S8 (step S9). For example, the system control unit 14 generates pop-up display data, including information of the advantageous item extracted in step S7, and transmits the pop-up display data to the user terminal 3. Also, the information of the advantageous item includes, for example, the item ID of the item, the item name, and the condition associated with the transaction condition content to be compared. When the user terminal 3 receives the pop-up display data transmitted in such a manner, the information of the advantageous item included in the pop-up display data is pop-up displayed in the vicinity of the mouseover select button 51 by the web browser as illustrated in FIG. 5B. In the example illustrated in FIG. 5B, an item name 53 of an advantageous item is displayed inside a pop-up window W as a pop-up display. In the example illustrated in FIG. 5B, the information of the advantageous item is pop-up displayed in the vicinity of the select button 51 in such a configuration that a part of an outer edge of a display area of the pop-up window W comes into contact with a part of an outer edge of a display area of the select button 51 (or in such a configuration that the display areas are partially overlapped with each other). Therefore, an item more advantageous than the item to be selected by a user is presented. A link is set to the item name 53 of the advantageous item that is pop-up displayed. Also, the information of the advantageous item may not be pop-up displayed, but may be displayed while being inserted into a predetermined display area of a web page.

Also, when the web page displayed on the user terminal 3 is a web page for performing an item purchase procedure, the information of the advantageous item included in the pop-up display data is pop-up displayed in the vicinity of, for example, an "item order procedure" button.

In a display state illustrated in FIG. 5B, when the item name 53 of the advantageous item is selected by the user (i.e., the advantageous item is selected), this is detected by the web browser, and a request for requiring a process of registering the selected item to a reference list (e.g., a bookmark list) (hereinafter, referred to as "request for registration of the advantageous item") is transmitted to the information providing server 1. Also, in a case where the web page displayed on the user terminal 3 is a web page for performing an item purchase procedure, when the item name of the advantageous item that is pop-up displayed is selected (i.e., the advantageous item is selected), this is detected by the web page, and a request for requiring a procedure of purchasing the selected item (hereinafter, referred to as "request for the purchase procedure of the advantageous item") is transmitted to the information providing server 1. Also, when the item name 53 of the advantageous item is selected by the user (i.e., the advantageous item is selected), it may be configured such that this is detected by the web browser, and a display is switched to a web page that displays detailed information of the selected item. That is, in this case, the detailed information of the selected item is presented to the user, instead of the process of registering the selected item to the reference list or the process of performing the procedure of purchasing the selected item.

On the other hand, as illustrated in FIG. 5B, even though a more advantageous item than the item to be selected by a user is presented to the user, when the select button 51 is selected by the user (i.e., a disadvantageous item is selected), this is detected by the web browser, and a request for requiring a process of registering an item associated with the select button 51 to a reference list (e.g., a bookmark list) (hereinafter, referred to as "request for registration of the disadvantageous item") is transmitted to the information providing server 1. Also, in a case where the web page displayed on the user terminal 3 is a web page for performing an item purchase procedure, for example, when an item order procedure button is selected by a user (i.e., a disadvantageous item is selected), this is detected by the web page, and a request for requiring a procedure of purchasing the selected item (hereinafter, referred to as "request for the purchase procedure of the disadvantageous item") is transmitted to the information providing server 1.

Also, an item ID of the disadvantageous item (item associated with the mouseovered select button 51) and an item ID of a more advantageous item (pop-up displayed advantageous item) than the corresponding item are included in the request for the registration or the request for the purchase procedure.

After transmitting the pop-up display data to the user terminal 3, the information providing server 1 starts the process illustrated in FIG. 4B. Also, the process illustrated in FIG. 4 also applies when the request for the purchase procedure is received.

In step S10 illustrated in FIG. 4B, the system control unit 14 acquires the item ID of the disadvantageous item and the item ID of the more advantageous item than the corresponding item from the received request for registration. Subsequently, the system control unit 14 determines whether the received request for the registration is a request for registration of the advantageous item (step S11). When the received request for the registration is the request for the registration of the advantageous item (step S11: YES), the system control unit 14 notifies information, which indicates that the more advantageous item than the corresponding item, instead of the disadvantageous item, is selected by the user, to a shop (provider) selling the disadvantageous item (step S12). Then, the system control unit 14 proceeds to a process corresponding to the request (e.g., a process of registering the selected item to a reference list, or a procedure of purchasing the selected item).

The information notified in step S12 includes a condition associated with an item name of a disadvantageous item and a transaction condition content (e.g., an item price) of the corresponding item, and a condition associated with an item name of an advantageous item and a transaction condition content (e.g., an item price) of the corresponding item. Therefore, the shop having received the corresponding notification can quickly grasp under which condition the exhibited item loses to other items. Therefore, the corresponding shop can quickly improve the condition associated with the losing item so as to attract the interest of users. Also, the notification of the above information to the shop (provider) selling the disadvantageous item is performed by, for example, an email. In this case, for example, the system control unit 14 acquires an email address of the shop selling the corresponding item from the shop information DB 12c, while the shop ID associated with the item ID of the disadvantageous item acquired in step S10 (the item specified in step S2) is used as a key. The system control unit 14 gives a notification to the corresponding shop by sending an email describing information indicating that the more advantageous item than the corresponding item, instead of the disadvantageous item, has been selected by the user, to the email address of the shop selling the disadvantageous item. Alternatively, the system control unit 14 may be configured such that the information indicating that the more advantageous item than the corresponding item, instead of the disadvantageous item, has been selected by the user is stored in association with the shop ID of the shop selling the disadvantageous item, and the stored information is notified to the web page displayed on the shop terminal 2 when the corresponding shop logs in from the shop terminal 2.

On the other hand, when it is determined that the received request for the registration is not the request for the registration of the advantageous item (step S11: NO), the system control unit 14 stores the information indicating the condition (e.g., the item price is 1,300 yen) associated with the item specified in step S2 (hereinafter, referred to as "first item") in the item information DB 12*d* in association with the item ID of the advantageous item acquired in step S10 (hereinafter, referred to as "second item") (step S13). Then, the system control unit 14 proceeds to a process corresponding to the request (e.g., a process of registering the selected item to a reference list, or a procedure of purchasing the selected item).

In step S13, after storing the condition (e.g., the item price is 1,300 yen) of the first item more disadvantageous than the second item (e.g., the item price is 1,000 yen) in association with the item ID of the second item (in other words, after selecting the item specified in step S2), when the item to be newly selected by the user (hereinafter, referred to as "third item") is specified in step S2, it is said that the second item (e.g., the item price is 1,000 yen) being the same as the first item specified in step S2 is extracted as the advantageous item with which the condition more advantageous to the user on transaction than the third item to be newly selected (e.g., the item price is 1,100 yen) is associated, in step S8 after passing through steps S3 to S7. In this case, the system control unit 14 may be configured to limit the presentation of the extracted second item when the more advantageous condition (e.g., the item price is 1,100 yen) than the condition of the first item (e.g., the item price is 1,300 yen) associated with the item ID of the extracted second item is associated with the third item specified in step S2. The limitation of the presentation of the second item is realized by, for example, excluding the item information from the pop-up display data so as to prevent the second item from being presented to the user. Alternatively, in the process of step S7, it may be configured such that the presentation of the second item is limited by excluding the second item from the extraction object. Limiting the presentation of the second item is that the user does not select the second item by particularly selecting the first item more disadvantageous than the second item. Therefore, for example, immediately after that, in a case where the user attempts to select the third item more advantageous than the first item, even when the second item more advantageous than the third item is presented, it is considered that the probability of selecting the second item is low. Therefore, when the third item to be newly selected by the user is specified after the first item is selected by the user even though the second item more advantageous than the first item is presented, it is configured to limit the presentation of the second item when the condition more disadvantageous to the user on transaction than the second item is associated with the third item and the condition more advantageous to the user on transaction than the first item is associated with the third item. In this manner, it is possible to prevent the user from becoming complex or to prevent the user from being confused.

As described above, according to the above embodiment, the information providing server 1 is configured to extract the item, which is identical to or related to the item to be selected by the user of the user terminal 3 and with which the condition more advantageous than the corresponding item is associated, from the storage unit 12 storing the information on the item referred to in the past time by the user, and present the extracted advantageous item to the user. Therefore, even when the user does not remember items because there are a lot of items referred to in the past time by the user, or the user forgets items, it is possible to notify the user of the presence of the advantageous item among such items and prevent the user from purchasing disadvantageous items or registering disadvantageous items. Also, since it is possible to prevent the user from registering disadvantageous items on transaction in the reference list, it is possible to reduce the process of deleting the disadvantageous items on transaction from the reference list, thereby reducing a system load.

Next, in the above embodiment, in a case where a plurality of transaction condition contents to be compared is set, a method of determining a condition advantageous to a user on transaction will be described below. In this case, the system control unit 14 acquires a condition associated with a plurality of transaction condition contents to be compared among a plurality of types of transaction condition contents of the item specified in step S2, and a condition associated with a plurality of transaction condition contents to be compared among a plurality of types of transaction condition contents of the item specified in step S5. Subsequently, the system control unit 14 determines values (hereinafter, referred to as "scores") corresponding to the acquired conditions associated with each transaction condition content, and calculates a total score of each item by aggregating the determined scores with respect to each item. Also, when determining the score from the condition, for example, a calculation formula for calculating a score from a condition may be used, or a table indicating a correspondence relationship between a condition and a score may be used.

FIG. 7 is a diagram illustrating the result obtained by aggregating scores corresponding to a condition associated with each transaction condition content of a specified item. In the example illustrated in FIG. 7, an item price, a point granting rate, number of items in stock, number of days required for delivery, and a delivery method are set as transaction condition contents to be compared, and a condition and a score associated with each transaction condition content are illustrated. Also, in the example illustrated in FIG. 7, a score corresponding to a condition associated with the delivery method is higher with respect to an item capable of the same-day delivery than an item incapable of the same-day delivery. Also, for example, when presenting an item more advantageous than an item to be selected for item purchase, it is preferable that a score corresponding to a case where the number of items in stock is "0" is, for example, minus, so that the item, of which the number in stocks is "0", cannot be extracted as an advantageous item. Subsequently, in step S7, the system control unit 14 compares the total score aggregated with respect to the item specified in step S2 with the total score aggregated with respect to the item specified in step S5, and determines whether the advantageous item, with which the condition more advantageous to the user on transaction than the item specified in step S2 is associated, is present in the items specified in step S5. Therefore, for example, the item, the total score of which is higher than the total score of the item specified in step S2, is extracted as the advantageous item. For example, in the example illustrated in FIG. 7, one item (item name: Food-stu, total score: 33 points) is extracted as the item more advantageous than the item to be selected by the user (item name: Food-abc, total scores: 32 points). According to this configuration, from the viewpoint that considers a plurality of different transaction condition contents in their entirety, it is possible to notify the user of the presence of the item more advantageous to the user on transaction than the item to be selected by the user.

Furthermore, in the above embodiment, it may be configured such that weights are set to the scores corresponding to the conditions associated with the transaction condition contents to be compared, based on importance of the corresponding transaction condition contents. In this case, the system control unit 14 sets weights determined for each transaction condition content with respect to the acquired scores corresponding to the conditions associated with each transaction condition content (e.g., multiplies the weight by the score), and calculates a total score of each item by aggregating the scores to which the weights are set. For example, in a default setting, the weights of the item price, the point granting rate, the number of items in stocks, the number of days required for delivery, and the delivery method are set to "1". However, in a change setting, for example, only the weight of the point granting rate among these transaction condition contents may be changed to "3" (in this case, in the example illustrated in FIG. 7, the item of which the item name is Food-xyz is extracted as the advantageous item). Therefore, the weights are effective if configured to be changed by an administrator of an online mall according to seasons or campaigns. For example, during a point increase campaign, if the weight of the point granting rate is configured to be larger than other transaction condition contents, the item having a higher point granting rate can be presented to the user as the advantageous item. Also, for example, during a same-day delivery campaign, if the weight of the delivery method including the same-day delivery as the condition (i.e., capable of the same-day delivery) is configured to be larger than other transaction condition contents, the item capable of the same-day delivery can be presented to the user as the advantageous item.

Furthermore, the weight of each transaction condition content may be configured to be customized according to the user's preference. In this case, the system control unit 14 specifies the transaction condition content the user regards as important among the transaction condition contents to be compared, based on the information on the transaction object referred to in the past time by the user (e.g., the purchase history of the user). In this case, for example, the transaction condition content the user regards as important is determined based on a statistical result obtained by taking statistics of the condition, which is selected in the past time by the user, from the purchase history of the user. From the statistical result, for example, when it is determined that the user selects an item with a small number of days required for delivery among a plurality of same items even though the corresponding item is high in price (when the user is a person who regards the number of days required for delivery as important), the number of days required for delivery is specified as the important transaction condition content. On the other hand, for example, when it is determined that the user selects an item with a low price among a plurality of same items even though the corresponding item has a large number of days required for delivery (when the user is a person who regards the item price as important), the item price is specified as the important transaction condition content. On the other hand, for example, when it is determined that the user selects an item with a high point granting rate among a plurality of same items with the same item price (when the user is a person who regards the point granting rate as important), the point granting rate is specified as the important transaction condition content. The system control unit 14 performs the aggregate by setting the weight for the score corresponding to the condition associated with the specified transaction condition content, to be higher than the weight for the value corresponding to the condition associated with the unspecified transaction condition content. According to this configuration, from the viewpoint of the transaction condition content the user regards as important, it is possible to notify the user of the presence of the item more advantageous to the user on transaction than the item to be selected by the user. That is, it is possible to notify the user of the presence of the item of which the condition corresponding to the transaction condition content the user regards as important is advantageous.

In the above embodiment, when receiving a request for a web page as illustrated in FIG. 5A from the user terminal 3, the information providing server 1 may be configured to consider and specify all or part of items posted on the web page (e.g., items defined by div tags (<div> . . . </div>) within the structured document constituting the web page) as "items to be selected by the user". In this case, the information providing server 1 performs the processes of steps S3 to S8 illustrated in FIG. 4A with respect to each specified item, inserts the information on the advantageous item extracted with respect to each specified item into the structured document constituting the web page, and transmits the information on the advantageous item to the user terminal 3 as a response. Therefore, the user terminal 3 can receive the web page and hold (i.e., store in the memory as the storing means) the information on the advantageous item extracted with respect to each specified item in advance (i.e., before the item is selected by the user). In a state in which the received web page is displayed, when the select button 51 of the desired item is indicated (i.e., selected) by the user, the web browser of the user terminal 3 specifies the item to be selected. The web browser of the user terminal 3 extracts an advantageous item, which is identical to or related to the specified item and with which a condition more advantageous than the corresponding item is associated, (i.e., item extracted by the information providing server 1 in advance) from the memory, and presents the extracted advantageous item to the user. According to such a configuration, the presence of an item more advantageous than an item to be selected can be more quickly notified. Also, in the case of this configuration, the user terminal 3 can also function as the information processing apparatus of the present invention (the CPU of the user terminal 3 functions as a specifying means, an extracting means, and a presenting means).

Also, in the above embodiment, the transaction objects according to the present invention have been applied to the items. However, the transaction objects may also be applied to services. Thus, the present invention may be applied to a system capable of service reservation. Examples of the service reservation include an accommodation reservation of an accommodation facility, a use reservation of a golf course or the like, a seat reservation of a transport facility, and the like. In this case, the information providing server 1 extracts a service, which is identical to or related to a service to be selected by the user of the user terminal 3 and with which a condition more advantageous than the corresponding item is associated, from a storing means storing information on the services referred to in the past time by the user, and presents the extracted service to the user.

REFERENCE SIGN LIST 1 information providing server
2 shop terminal
3 user terminal
11 communication unit
12 storage unit
12a membership information DB 12b genre information DB
12c shop information DB
12d item information DB
12e browsing history DB
12f purchase history DB
12g reference list registration history DB
13 input/output interface
14 system control unit
14a CPU
14b ROM
14c RAM
15 system bus
NW network
S information providing system

The invention claimed is:

1. An information processing apparatus, comprising:
at least one non-transitory memory operable to store program code; and
at least one processor operable to read said program code and operate as instructed by said program code, said program code including:
presenting code configured to cause a page to be presented on a screen, the page containing information about one or more transaction objects and one or more user selectable elements provided for performing a predetermined process on the one or more transaction objects;
identifying code configured to identify a first transaction object corresponding to an element that a user is about to select from the one or more user-selectable elements, the element that the user is about to select being detected based on a positional relationship between a pointer that moves in accordance with instructions from a pointing device being operated by the user and the one or more user-selectable elements presented on the screen; and
extracting code configured to identify a second transaction object, which is identical to or related to the first transaction object and with which a condition more advantageous to the user on transaction than the first transaction object is associated, from a storage that stores information on transaction objects referred to in a past time by the user, wherein
the presenting code is further configured to cause information about the second transaction object to be presented in the neighborhood of or over the element that the user is about to select.

2. The information processing apparatus according to claim 1,
said program code further comprising:
first limiting code configured to exclude the presentation of the second transaction object, when the second transaction object has been referred to by the user within a predetermined past time from a present time.

3. The information processing apparatus according to claim 2, said program code further comprising:
second limiting code configured to exclude a second presentation of the second transaction object in a case where a condition more disadvantageous to the user than the second transaction object is associated with a third transaction object and a condition more advantageous to the user on transaction than the first transaction object is associated with the third transaction object, when the third transaction object is specified by the identifying code based on a second user performance after the first transaction object is selected by the user, even though the second transaction object has been presented to the user by the presenting code in a past time.

4. The information processing apparatus according to claim 2, said program code further comprising:
notifying code configured to, when the second transaction object is selected by the user, notify a provider, wherein the provider provides the first transaction object, of selection information indicating the selection of the second transaction object presented by the presenting code, instead of the transaction object, wherein the selection information is configured to assist the provider in improving a condition associated with the first transaction object.

5. The information processing apparatus according to claim 2,
wherein a plurality of conditions are associated with each of the first and second transaction objects,
the program code further comprises an aggregating code configured to form a score by aggregating values corresponding to a plurality of conditions for each of the first and second transaction objects, and
wherein the extracting code is further configured to identify the second transaction object by comparing a second value of the score which is aggregated by the aggregating code with respect to the second transaction object with a first value of the score which is aggregated by the aggregating code with respect to the first transaction object.

6. The information processing apparatus according to claim 1, said program code further comprising:
first limiting code that limits the presentation of a predetermined number of the transaction objects retroactively to a past time from a present time among the transaction objects in the storage.

7. The information processing apparatus according to claim 6, said program code further comprising:
second limiting code configured to limit the presentation of a second transaction object in a case where a condition more disadvantageous to the user on transaction than the second transaction object is associated with a third transaction object and a condition more advantageous to the user on transaction than a first transaction object is associated with the third transaction object, when the third transaction object to be newly selected by the user is specified by the identifying code after the first transaction object is selected by the user, even though the second transaction object associated with a condition more advantageous to the user on transaction than the first transaction object specified by the identifying code is presented to the user by the presenting code.

8. The information processing apparatus according to claim 6, said program code further comprising:
notifying code configured to, when the transaction object presented by the presenting code is selected by the user, notify a provider, which provides the first transaction object identified by the identifying code, of information indicating the selection of the second transaction object presented by the presenting code, instead of the first transaction object.

9. The information processing apparatus according to claim 6,
wherein a condition is associated with each of the transaction objects with respect to one or more contents,
the program code further comprises aggregating code that aggregates values corresponding to conditions associated with the one or more contents among the contents associated with the first transaction object, and the extracting code is further configured to extract the second transaction object by comparing a value which is aggregated by the aggregating code with respect to the first transaction object, with a value which is aggregated by the aggregating code with respect to the transaction object that is identical to or related to the specified transaction object and is stored in the storage.

10. The information processing apparatus according to claim 1, said program code further comprising:

second limiting code configured to exclude a second presentation of the second transaction object in a case where a condition more disadvantageous to the user than the second transaction object is associated with a third transaction object and a condition more advantageous to the user on transaction than the first transaction object is associated with the third transaction object, when the third transaction object is specified by the identifying code based on a second user performance after the first transaction object is selected by the user, even though the second transaction object has been presented to the user by the presenting code in a past time.

11. The information processing apparatus according to claim 1, said program code further comprising:

notifying code configured to, when the second transaction object is selected by the user, notify a provider, wherein the provider provides the first transaction object, of selection information indicating the selection of the second transaction object presented by the presenting code, instead of the first transaction object, wherein the selection information is configured to assist the provider in improving a condition associated with the first transaction object.

12. The information processing apparatus according to claim 1, wherein the first information is included in at least one of a history of a transaction history of transaction objects on which the user has conducted a transaction, a registration history of transaction objects registered in a predetermined reference list by the user, and a browsing history of transaction objects arranged in a page browsed by the user.

13. The information processing apparatus according to claim 12, wherein when the transaction object to be selected for the transaction is specified, the extracting code is configured to preferentially extract, from the transaction history, a transaction object which is identical to or related to the specified transaction object and with which a condition more advantageous to the user on transaction than the corresponding transaction object is associated.

14. The information processing apparatus according to claim 12, wherein when a transaction object to be selected for a registration is specified, the extracting code is further configured to preferentially identify, from the registration history, an identifier of the second transaction object.

15. The information processing apparatus according to claim 1, wherein a plurality of conditions are associated with each of the first and second transaction objects, the program code further comprises an aggregating code configured to form a score by aggregating values corresponding to the plurality of conditions for each of the first and second transaction objects, and the extracting code is further configured to identify the second transaction object by comparing a second value of the score which is aggregated by the aggregating code with respect to the second transaction object, with a first value of the score which is aggregated by the aggregating code with respect to the first transaction object.

16. The information processing apparatus according to claim 15, said program code further comprising:

content specifying code configured to specify a content which the user regards as important, based on information on transaction objects referred to in the past time by the user, wherein the aggregating code is configured to form the score by setting a weight for a value corresponding to a condition associated with the content specified by the content specifying code, to be higher than a weight for a value corresponding to a condition associated with a content unspecified by the content specifying code.

17. The information processing apparatus according to claim 1, wherein the extracting code is configured to determine the condition more advantageous to the user based on a statistical result, and wherein the statistical result is based on statistics of conditions selected in a past time by the user with reference to a purchase history of the user.

18. The information processing apparatus according to claim 1, wherein the condition includes at least one of: a price, a delivery fee, a point-granting rate, a number of corresponding items in stock, an evaluation of a shop, and a number of days for delivery.

19. The information processing apparatus according to claim 1, wherein the program code further includes receiving code configured to receive information indicating the first transaction object immediately before a selection of the first transaction object by the user.

20. The information processing apparatus according to claim 1, wherein the element that the user is about to select is detected when the pointer becomes positioned within or near a display area of the element.

21. The information processing apparatus according to claim 1, wherein the predetermined process performed on a transaction object is a process for registering the transaction object in a reference list.

22. The information processing apparatus according to claim 1, wherein the predetermined process performed on a transaction object is a process for purchasing the transaction object.

23. The information processing apparatus according to claim 1, wherein the one or more user-selectable elements are each arranged at a different position in the page from the information about the corresponding one or more transaction objects.

24. An information processing method, which is performed by a computer, the information processing method comprising:

presenting a page on a screen, the page containing information about one or more transaction objects and one or more user selectable elements provided for performing a predetermined process on the one or more transaction objects;

identifying a first transaction object corresponding to an element that a user is about to select from the one or more user-selectable elements, the element that the user is about to select being detected based on a positional relationship between a pointer that moves in accordance with instructions from a pointing device being operated by the user and the one or more user-selectable elements presented on the screen; and identifying a second transaction object, which is identical to or related to the first transaction object and with which a condition more advantageous to the user on transaction than the first transaction object is associated, from a storage that stores information on transaction objects referred to in a past time by the user, wherein the presenting further comprises causing information about the second transaction object to be presented in the neighborhood of or over the element that the user is about to select.

* * * * *